United States Patent

Kato et al.

[11] Patent Number: 6,016,362
[45] Date of Patent: Jan. 18, 2000

[54] APPARATUS AND METHOD FOR IMAGE CODING AND DECODING

[75] Inventors: Motoki Kato; Takashi Kojima, both of Kanagawa, Japan

[73] Assignee: Sony Corporation, Tokyo, Japan

[21] Appl. No.: 08/887,770

[22] Filed: Jul. 3, 1997

[30] Foreign Application Priority Data

Jul. 9, 1996 [JP] Japan ................. 8-178958

[51] Int. Cl.$^7$ .................................................. G06K 9/36
[52] U.S. Cl. ........................................... 382/232; 382/236
[58] Field of Search .................... 382/232, 236; 348/14, 15, 565

[56] References Cited

U.S. PATENT DOCUMENTS 5,673,079  9/1997  Satoh ........................................ 348/15

OTHER PUBLICATIONS

Zwaneveld et al., "Re–engineering Negative Inspection and Cutting: A study of Its Work Process Ergonomics and the Definition of Computerized Workstations for each Activity", SMPTE Journal, Vo. 104, p. 751, Nov. 1995.

Reynolds, "The Evolution of Digital Audio and Video Format Conversions", SMPTE Journal, vol. 103, p. 644, Oct. 1994.

Turner, "1,001 Questions to Ask Before Deciding on a Nonlinear Video Editing System", SMPTE Journal, vol. 103, p. 160, Mar. 1994.

Tonge, "The Service Multiplex", SMPTE Journal, vol. 103, p. 395, Jun. 1994.

Baron et al., "MPEG Overview", SMPTE Journal, vol. 103, p. 391, Jun. 1994.

*Primary Examiner*—Jose L. Cuoso
*Assistant Examiner*—Anh Hong Do
*Attorney, Agent, or Firm*—Frommer Lawrence & Haug, LLP.; William S. Frommer

[57] ABSTRACT

Encoding and decoding apparatuses and methods and a transmission or recording system arranged to display an image with an approval of a maker who made the image. In a coordinate converter, cutting-out position information provided under the supervision of the maker and recorded on a recording medium is read out and converted into squeezed image cutting-out position information, which is supplied from the coordinate converter to a multiplexer. An encoder encodes a corresponding squeezed image supplied from a telecine apparatus. Encoded data thereby obtained is supplied to the multiplexer. The multiplexer multiplexes the squeezed image cutting-out information from the coordinate converter and the encoded data from the encoder to obtain multiplex data. This multiplex data is recorded on a recording medium or transmitted over a predetermined transmission channel.

9 Claims, 12 Drawing Sheets

FILM

CUTTIING-OUT
TAKING-IN

FIG.3B

EDGE-CROPPED
IMAGE

FIG.4A

FILM

ASPECT RATIO CONVERSION
TAKING-IN

FIG.4B

SQUEEZED IMAGE

CUTTIING-OUT AND ENLARGEMENT

FIG.4C

EDGE-CROPPED IMAGE

FIG.5A
FILM

FIG.5B
SQUEEZED
IMAGE

FIG.8B
EDGE GROUP

FIG.8A
FILM

FIG.8C
LETTER BOX

SQUEEZE
FIG.8D

APPARATUS AND METHOD FOR IMAGE CODING AND DECODING

BACKGROUND OF THE INVENTION

1. Field of the Invention

The present invention relates to image coding and decoding apparatuses, image coding and decoding methods, an image transmission method and a recording medium. More particularly, the present invention relates to image coding and decoding apparatuses, image coding and decoding methods, an image transmission method and a recording medium suitable for the process of converting, for example, motion picture images on a film into a television signal, encoding, transmitting and decoding the television signal.

2. Description of the Related Art

A motion picture is considered to be, for example, a sequence of photographs developed on a film. To televise such a motion picture or record it on a recording medium such as a video tape, it is necessary to convert images on the film into a television signal. Ordinarily, such conversion is called "telecine" and is made by using a telecine apparatus.

In a telecine apparatus used for such a purpose, an image on a film is read as an electrical signal and is converted into a video signal. The video signal undergoes, for example, display rate conversion and other necessary processings. In this manner, a television signal in accordance with a television broadcasting standard is obtained.

The aspect ratio of images in the form of video frames in the current television broadcasting (the ratio of the lengths of horizontal and vertical sides of display screen) is ordinarily 4:3 while the ratio of the lengths of the horizontal and vertical sides of frames on an ordinary film is approximately 16:9. A telecine process under such a condition requires processing 16:9 frames on a film to form 4:3 frames (frames having an aspect ratio of 4:3).

As a method for such aspect ratio conversion, the edge cropping method, the letter box method and the squeeze method described below with reference to FIG. 8 are known.

Figure 8A:
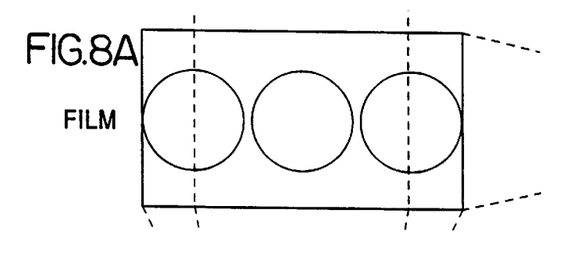
FIG. 8 is a diagram of an aspect ratio conversion method.
Figure 8B:
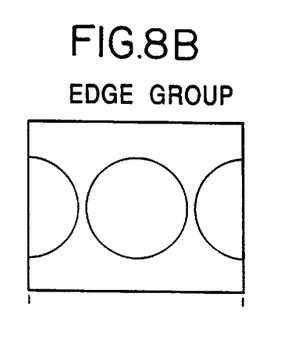
Figure 8C:
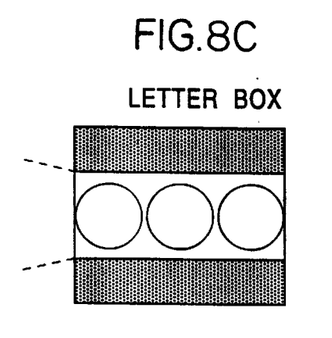

According to the edge cropping method (FIG. 8(B)), a portion of a 16:9 frame on a film (FIG. 8(A)) is cut out to form a 4:3 frame. According to the letter box method (FIG. 8(C)), blank spaces (black areas in FIG. 8(C)) are added adjacent to the upper and lower sides of the 16:9 film frame to form a 4:3 frame. According to the squeeze method (FIG. 8(D)), the width of the 16:9 film frame in the horizontal direction is reduced to form a 4:3 frame.

Basically, squeezing of the squeeze method is conversion performed for the purpose of displaying a 16:9 frame on a 16:9 monitor by transmitting the frame as the current television signal (the television signal of the aspect ratio of 4:3).

A sequence of images formed by the edge cropping method (edge-cropped images) and televised or recorded on a recording medium to be sold is produced as described below. Such a sequence of edge-cropped images is obtained not by simply cutting out central areas of a sequence of frames on a film but by a telecine process supervised by the maker who made the sequence of images on the film (e.g., a film director). In the telecine process, image areas to be cut out are designated such as to make a version of the original work, and the designated areas are cut out.

Figure 9:
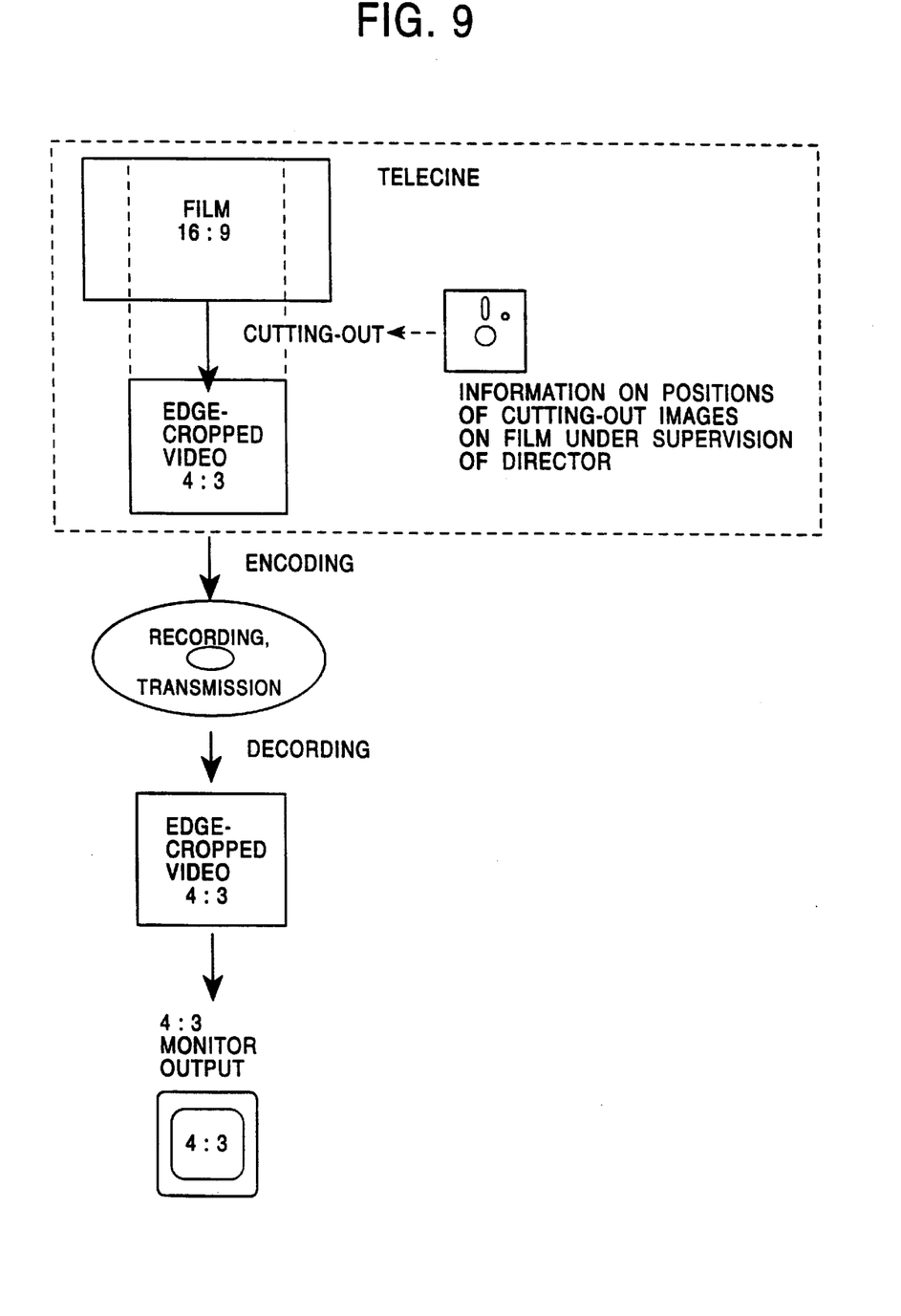
FIG. 9 is a diagram of a method of forming an edge-cropped image.

That is, as shown in FIG. 9, information on cutting-out positions on a film designated by a filmmaker is input to a telecine apparatus. The telecine apparatus cuts out portions of frames on the film in accordance with the cutting-out position information, thereby making a sequence of 4:3 edge-cropped images.

For example, a sequence of edge-cropped images made in this manner is encoded and recorded on a recording medium or transmitted over a predetermined transmission channel. On the user side, each edge-cropped image recorded on the recording medium or transmitted over the transmitted channel is reproduced or received. The reproduced or received image is decoded to be displayed on a 4:3 monitor (a monitor having an aspect ratio of 4:3).

Figure 8D:
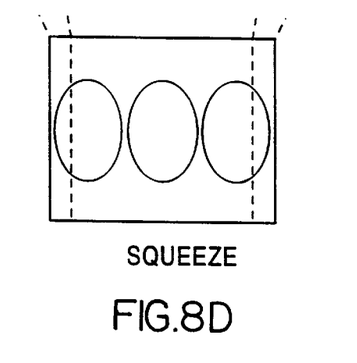
Figure 10:
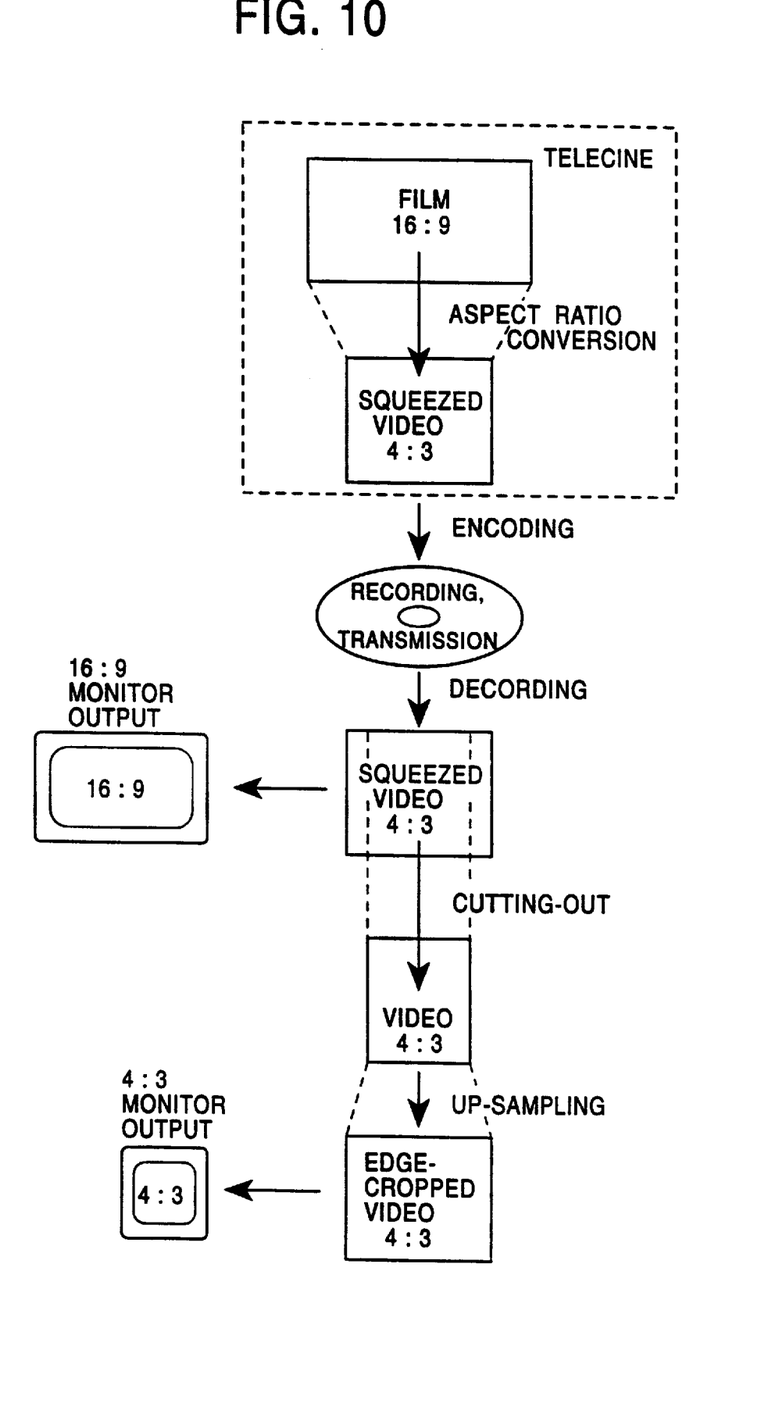
FIG. 10 is a diagram of a method of forming a squeezed image.

A sequence of images formed by the squeeze method (squeezed images) and televised or recorded on a recording medium to be sold is produced as described below. As shown in FIG. 10, each of a sequence of images on a film is filtered in the horizontal direction so that the aspect ratio is set to 4:3, thereby forming a sequence of images elongated in the vertical direction as shown in FIG. 8(D). Each elongated 4:3 image, i.e., a squeezed image, is encoded and recorded on a recording medium or transmitted over a predetermined transmission channel, as is the above-described edge-cropped image.

Figure 11:
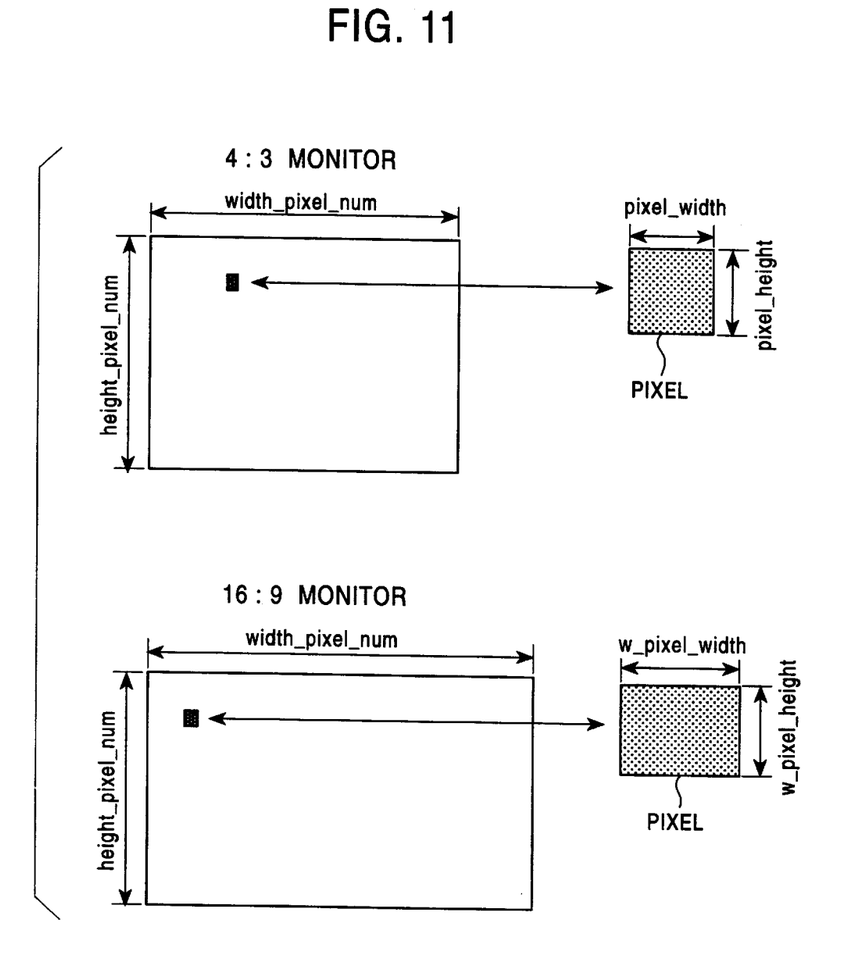
FIG. 11 is a diagram of pixels in monitors having aspect ratios of 4:3 and 16:9.

On the user side, the squeezed image recorded on the recording medium or transmitted over the transmitted channel is reproduced or received and is decoded. If a monitor having an aspect ratio of 16:9 is provided on the user side, the decoded squeezed image is supplied to and displayed on the 16:9 monitor. As shown in FIG. 11, the 16:9 monitor has pixels elongated in the horizontal direction in comparison with pixels of a 4:3 monitor. On the 16:9 monitor, therefore, the squeezed image is displayed in the original state, that is, the image elongated in the vertical direction is displayed by being extended in the horizontal direction.

The above-described squeezed image can also be displayed on a 4:3 monitor, as shown in FIG. 10. That is, a portion of the squeezed image is cut out and up-sampled to form an image having an aspect ratio of 4:3 to be displayed on the 4:3 monitor. The 4:3 image displayed on the 4:3 monitor is equivalent to the image obtained by edge-cropping the image on the film.

However, if a sequence of squeezed images is displayed on a 4:3 monitor in the above-described manner, a problem in terms of copyright arises.

Figure 12:
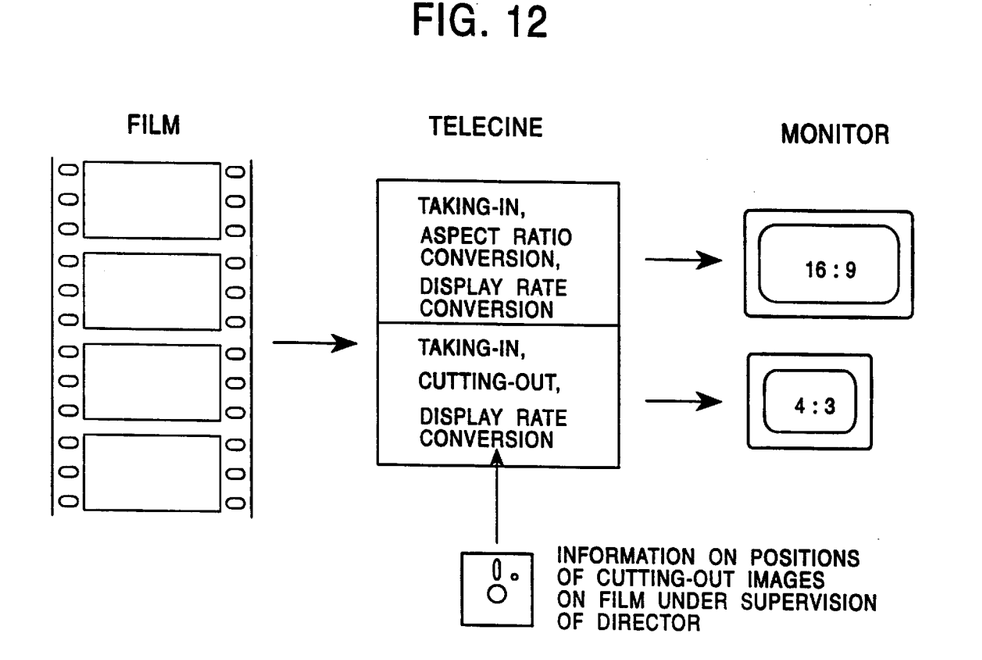
FIG. 12 is a diagram for explaining a problem of the system of cutting out a portion of a squeezed image.

In the case where a sequence of squeezed images converted from a sequence of images on a film by a telecine apparatus is displayed on a 16:9 monitor as shown in FIG. 12, the images on the film are reproduced in the original form on the 16:9 monitor and, therefore, no copyright problem arises. On the other hand, in the case where a sequence of squeezed images converted from a sequence of images on a film by a telecine apparatus is displayed on a 4:3 monitor, there is a possibility of an edge-cropped image without director's approval being displayed, that is, an image cut out from the image on the film irrespective of cutting-out information provided under the supervision of the maker may be displayed.

SUMMARY OF THE INVENTION

In view of these circumstances, an object of the present invention is to provide an image coding/decoding system which enables an image to be always displayed in accordance with cutting-out information provided under the supervision of the maker who made the image.

To achieve this object, according to one aspect of the present invention, there is provided an image coding apparatus comprising encoding means for encoding an image, and multiplexing means for multiplexing an output from the encoding means and cutting-out position information on positions at which a portion of the image is cut out under the supervision of a maker who made the image.

According to another aspect of the present invention, there is provided an image encoding method comprising the steps of encoding an image, and multiplexing the encoded image and cutting-out position information on positions at which a portion of the image is cut out under the supervision of a maker who made the image.

According to still another aspect of the present invention, there is provided an image decoding apparatus comprising separation means for separating, from transmitted data, encoded data obtained by encoding an image and cutting-out position information on positions at which a portion of the image is cut out under the supervision of a maker who made the image, decoding means for decoding the encoded data into the image, and cutting-out means for cutting out, in accordance with the cutting-out position information, a portion of the image decoded by the decoding means.

According to yet another aspect of the present invention, there is provided an image decoding method comprising the steps of separating, from transmitted data, encoded data obtained by encoding an image and cutting-out position information on positions at which a portion of the image is cut out under the supervision of a maker who made the image, decoding the encoded data into the image, and cutting out, in accordance with the cutting-out position information, a portion of the image obtained by decoding in the decoding step.

According to a further aspect of the present invention, there is provided a method of transmitting an image, comprising the steps of forming multiplex data by multiplexing the image and cutting-out position information on positions at which a portion of the image is cut out under the supervision of a maker who made the image, and transmitting the multiplex data.

According to still a further aspect of the present invention, there is provided a recording medium on which an image is recorded together with cutting-out position information on positions at which a portion of the image is cut out under the supervision of a maker who made the image.

In the above-described image coding apparatus, the encoding means encodes an image, and the multiplexing means multiplexes an output from the encoding means and cutting-out position information on positions at which a portion of the image is cut out under the supervision of a maker who made the image.

In the above-described image encoding method, an image is encoded and the encoded image is multiplexed with cutting-out position information on positions at which a portion of the image is cut out under the supervision of a maker who made the image.

In the above-described image decoding apparatus, the separation means separates, from transmitted data, encoded data obtained by encoding an image and cutting-out position information on positions at which a portion of the image is cut out under the supervision of a maker who made the image, and the decoding means decodes the encoded data into the image. The cutting-out means cuts out, in accordance with the cutting-out position information, a portion of the image decoded by the decoding means.

In the above-described image decoding method, encoded data obtained by encoding an image and cutting-out position information on positions at which a portion of the image is cut out under the supervision of a maker who made the image are separated from transmitted data, the encoded data is decoded into the image, and a portion of the image obtained by decoding in the decoding step is cut out in accordance with the cutting-out position information.

In the above-described image transmission method, an image and cutting-out position information on positions at which a portion of the image is cut out under the supervision of a maker who made the image are multiplexed into multiplex data to be transmitted.

On the above-described recording medium, an image is recorded together with cutting-out position information on positions at which a portion of the image is cut out under the supervision of a maker who made the image.

DESCRIPTION OF THE PREFERRED EMBODIMENTS

Embodiments of the present invention will be described below with reference to the accompanying drawings.

Figure 1:
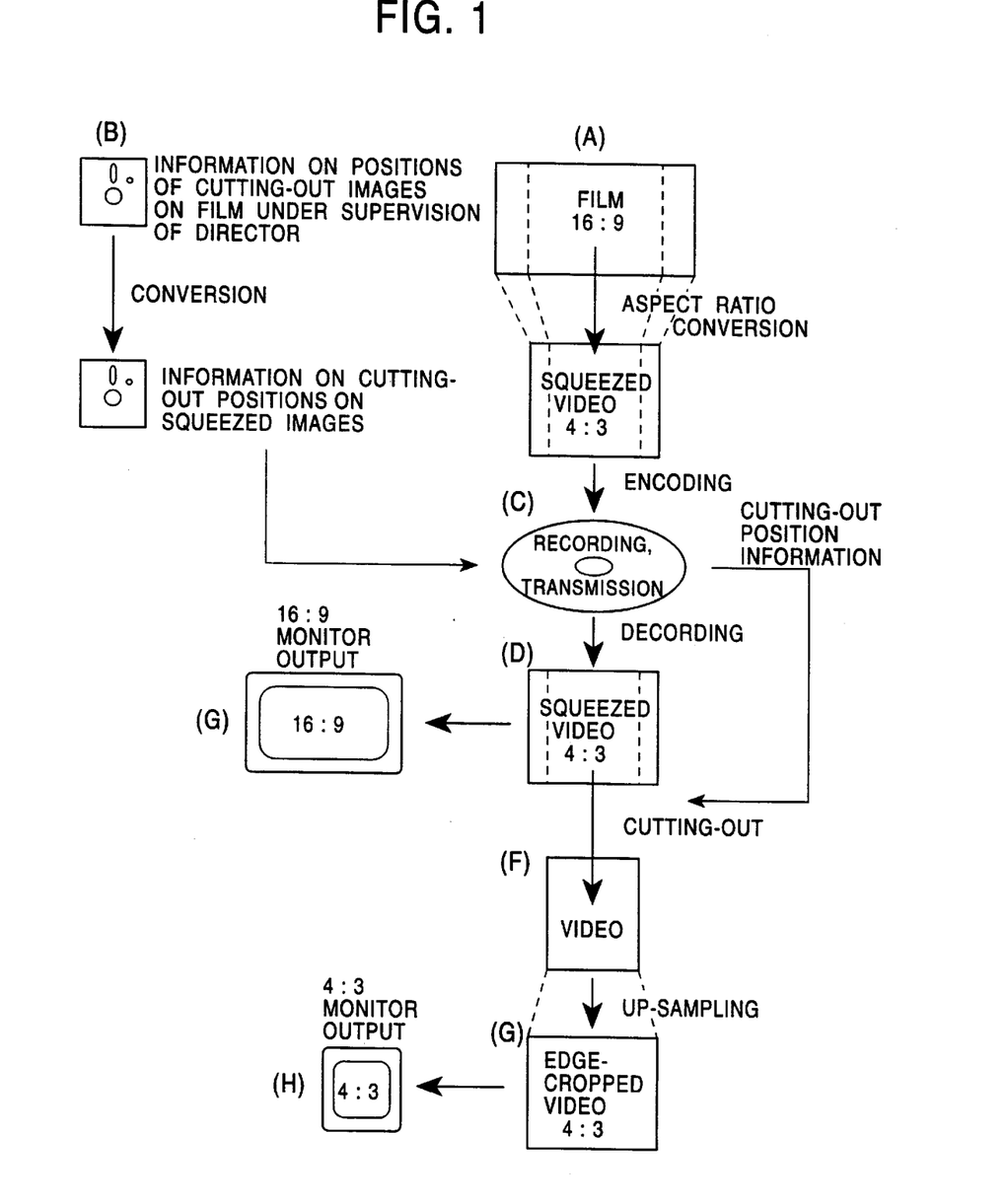
FIG. 1 is a diagram showing an outline of the present invention.

An outline of the present invention will first be described with reference to FIG. 1. For example, in the case where a motion picture is telecine-converted to be televised, a sequence of edge-cropped images having a vertical-horizontal ratio of 4:3 is made by the process of cutting out a portion of each of the frames on the film having an aspect ratio of 16:9 with a telecine apparatus under the supervision of the maker who made the images on the film, as described above. Information on cutting-out positions at which the frame portions are to be cut out is input by operating the telecine apparatus or other operations. Ordinarily, the cutting-out position information is recorded on a recording medium, e.g., a magnetic disk capable of being loaded in and unloaded from the telecine apparatus. As long as image portions are cut out in accordance with the cutting-out position information recorded on the recording medium (cutting-out information provided under the supervision of the maker), the resulting sequence of images (edge-cropped images) is regarded as one with director's approval.

According to the present invention, therefore, a sequence of images are transmitted or recorded on a recording medium together with information such as the above-described cutting-out position information provided under the supervision of the maker of the sequence of images (a film director or the like), thereby enabling display of a sequence of edge-cropped images with director's approval on the user side.

That is, a sequence of 16:9 images on a film is converted into a sequence of 4:3 squeezed images and is encoded (as shown in FIG. 1(A)) while information on the cutting-out positions determined under the supervision of the maker is converted into cutting-out position information with respect to the squeezed images (as shown in FIG. 1(B)).

The cutting-out position information provided under the supervision of the maker is converted into cutting-out position information with respect to the sequence of squeezed images for the reason described below. That is, the cutting-out position information provided under the supervision of the maker is information on positions in the sequence of images on the film. Since in this case the images on the film are converted into squeezed images, it is necessary to correspondingly convert the cutting-out position information.

The cutting-out position information provided under the supervision of the maker is recorded on a recording medium in the telecine apparatus used to form the edge-cropped images, as mentioned above. Therefore, the information may be obtained by purchasing the recording medium (or a copy of the recording medium).

The cutting-out position information with respect to the sequence of squeezed images (squeezed image cutting-out position information) is multiplexed with the encoded squeezed images. Multiplex data thereby obtained is recorded on a recording medium or transmitted over a predetermined transmission channel (as shown in FIG. 1(C)).

On the user side, the multiplex data is reproduced from the recording medium or the transmitted multiplex data is reduced. The multiplex data is separated into the sequence of encoded squeezed images and squeezed image cutting-out position information. The sequence of encoded squeezed images is decoded (as shown in FIG. 1(D)). If the sequence of decoded squeezed images is displayed on a monitor having an aspect ratio of 16:9, the squeezed image cutting-out position information is ignored. In this case, each squeezed image is displayed on the 16:9 monitor in the original state (in the state of being extended in the horizontal direction) (as shown in FIG. 1(E)).

If the sequence of decoded squeezed images is displayed on a monitor having an aspect ratio of 4:3, a portion of each squeezed image is cut out in accordance with the squeezed image cutting-out position information (as shown in FIG. 1(F)) and the cut-out portion is up-sampled into a 4:3 edge-cropped image (as shown in FIG. 1(G)). The resulting sequence of edge-cropped images, considered to be formed with director's approval, is displayed on the 4:3 monitor (as shown in FIG. 1(H)).

Figure 2:
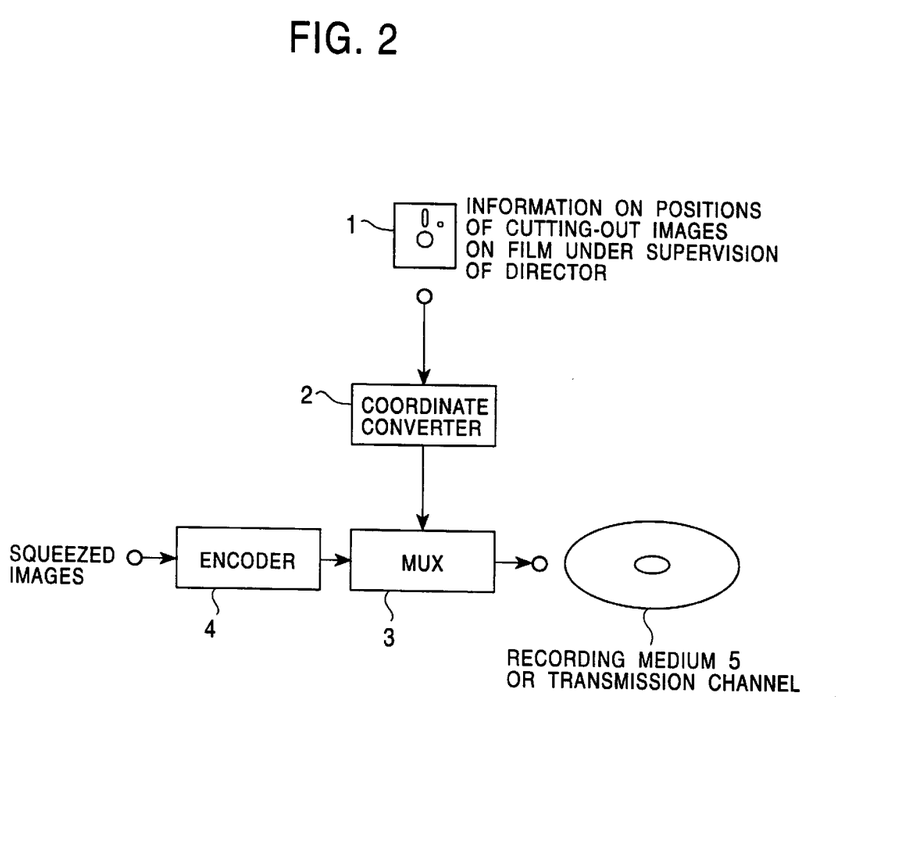
FIG. 2 is a block diagram showing the configuration of an embodiment of an image coding apparatus to which the present invention is applied.

FIG. 2 shows the configuration of an embodiment of an image coding apparatus to which the present invention is applied. Cutting-out position information provided under the supervision of a maker who made a sequence of images input to an encoder 4 described below is recorded on a recording medium 1. A coordinate converter (conversion means) 2 is arranged to convert the cutting-out position information provided under the supervision of the maker into squeezed image cutting-out position information and to supply this information to a multiplexer (MUX) 3 (multiplexing means). The multiplexer 3 is arranged to multiplex the squeezed image cutting-out position information supplied from the coordinate converter 2 and encoded data supplied from the encoder 4 (encoding means) and to output the multiplexed data. The encoder 4 is arranged to encode a sequence of squeezed images supplied from a telecine apparatus (not shown) in a Moving Picture Experts Group (MPEG) coding manner, for example, and to supply the encoded data to the multiplexer 3.

In the image coding apparatus thus arranged, the coordinate converter 2 reads out the cutting-out position information provided under the supervision of the maker and recorded on the recording medium 1, and converts this information into squeezed image cutting-out position information. This squeezed image cutting-out position information is supplied from the coordinate converter 2 to the multiplexer 3.

On the other hand, the encoder 4 encodes the sequence of squeezed images into encoded data by MPEG coding and supplies the encoded data to the multiplexer 3. The multiplexer 3 multiplexes the squeezed image cutting-out position information supplied from the coordinate converter 2 and the encoded data supplied from the encoder 4 to obtain multiplexed data. The multiplexed data obtained by the multiplexer 3 is recorded on a recording medium 5, which is, for example, an optical disk (e.g., a Digital Versatile Disc (DVD)), a magnetic tape, a magnetic disk or the like, or is transmitted over a predetermined transmission channel (e.g., a ground wave channel, a satellite communication channel, or a channel in a cable television (CATV) network).

Processing in the coordinate converter 2 shown in FIG. 2 will next be described with reference to FIGS. 3 to 5. It is assumed here that the lengths of the horizontal and vertical sides of each of images on a film having an aspect ratio of 16:9 are "Film_width" and "Film_height" [millimeters (mm)], respectively, and that a 4:3 image into which each image on the film is converted is formed of a rectangular array of pixels "Video_width_pixel" by "Video_height_pixel". "Video_width_pixel" represents the number of pixels in the horizontal direction and "Video_height_pixel" represents the number of pixels in the vertical direction.

Figure 3A:
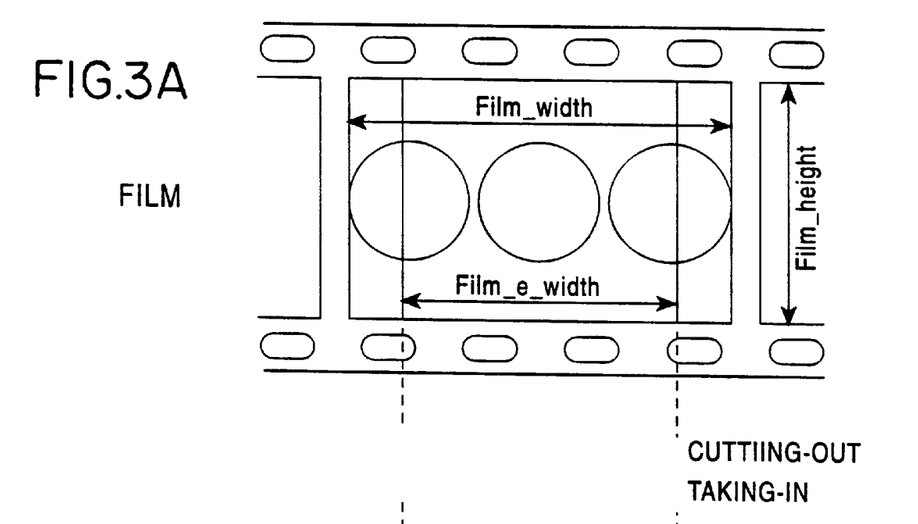
FIG. 3 is a diagram for explaining processing in a coordinate converter 2 shown in FIG. 2.

FIG. 3 shows conversion of each of images on a film having an aspect ratio of 16:9 into an edge-cropped image having an aspect ratio of 4:3. It is also assumed that the maker of the images on the film (FIG. 3(A)) has designated a rectangular area having a center Xe [mm] apart from the film center in the horizontal and Ye [mm] apart from the film center in the vertical direction (Ye=0 in the example shown in FIG. 3) and having horizontal sides "Film_e_width" [mm] long and vertical sides "Film_height" [mm] long (the ratio of the lengths of horizontal and vertical sides being 4:3).

Figure 3B:
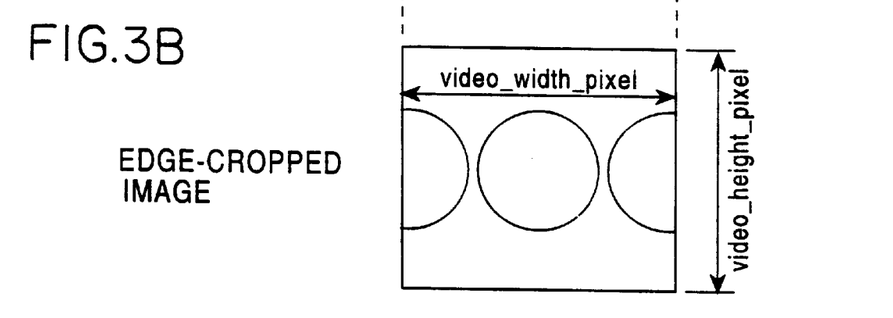

Under this condition, the portion of the images on the film corresponding to the rectangular area having "Film_e_width" [mm] long horizontal sides and "Film_height" long [mm] vertical sides is sampled into "Video_width_pixel"×"Video_height_pixel" pixels to form a 4:3 edge-cropped image (FIG. 3(B)).

Figure 4A:
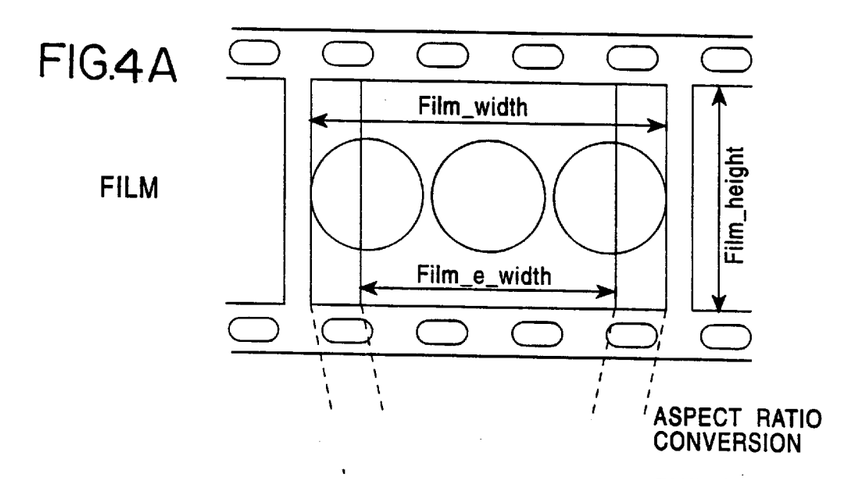
FIG. 4 is another diagram for explaining processing in the coordinate converter 2 shown in FIG. 2.
Figure 4B:
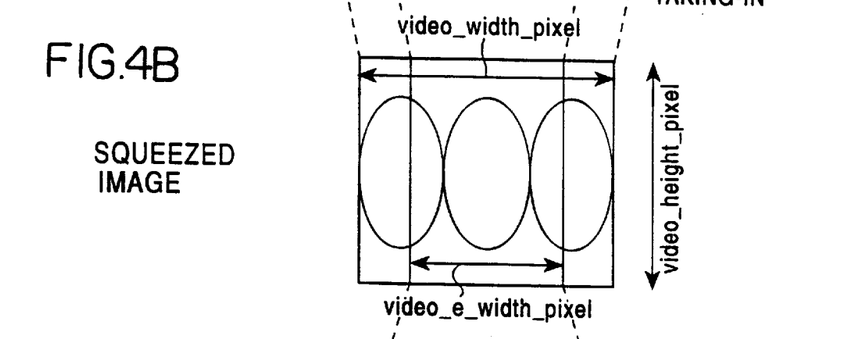

FIG. 4 shows conversion of each of images on a film having an aspect ratio of 16:9 into a squeezed image having an aspect ratio of 4:3. In this case, the entire image on the film corresponding to the rectangular area having "Film_width" [mm] long horizontal sides and "Film_height" [mm] long vertical sides (FIG. 4(A)) is sampled into "Video_width_pixel"דVideo_height_pixel" pixels to form a 4:3 squeezed image (FIG. 4(B)).

It is also assumed that the images on the films shown in FIGS. 3(A) and 4(A) are identical to each other, and that, in the conversion from the image shown in FIG. 4(A) to the squeezed image shown in FIG. 4(B), the same portion of the image on the film as that sampled into the pixels forming the edge-cropped image shown in FIG. 3(B) is sampled into an array of "Video_e_width_pixel"×"Video_height_pixel" pixels having a center at coordinates (Xe_pixel, Ye_pixel) on the squeezed image in the pixels forming the squeezed image.

Figure 4C:
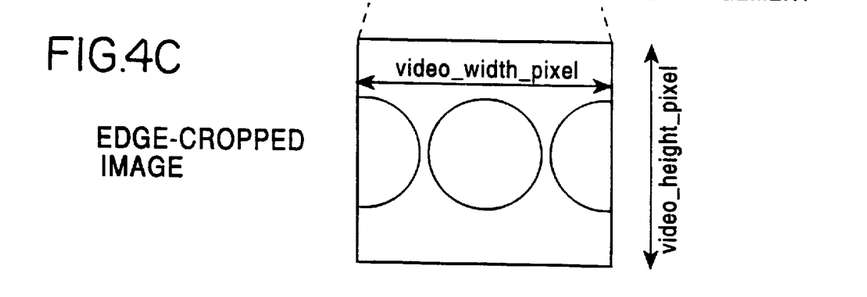

To obtain the same edge-cropped image (FIG. 4(C)) as that shown in FIG. 3(B) from the squeezed image shown in FIG. 4(B), the rectangular area formed of "Video_e_width_pixel"×"Video_height_pixel" pixels centered on the coordinates (Xe_pixel, Ye_pixel) on the squeezed image may be cut out, aspect ratio-converted and up-sampled by horizontal (lateral) filtering such that the number of pixels in the horizontal direction is increased from "Video_e_width_pixel" to "Video_width_pixel", as described below in detail.

A case will be discussed where the cutting-out position information provided under the supervision of the maker denotes, for example, a rectangular area, such as that shown in FIG. 5, having a center Xe [mm] apart from the film center in the horizontal direction and having "Film_e_width" [mm] long horizontal sides and "Film_height" [mm] long vertical sides (the ratio of the lengths of horizontal and vertical sides being 4:3). Since the formation of a squeezed image is such that the entire frame on the film is sampled into the rectangular area formed of an array of "Video_width_pixel"×"Video_height_pixel" pixels, the size (the lengths of horizontal and vertical sides) of the film portion corresponding to one pixel constituting the squeezed image is as shown below.

Length of horizontal side:
Film_width/Video_width_pixel [mm/pixel]
Length of vertical side:
Film_height/Video_height_pixel [mm/pixel]

Also, since the ratio of "Film_e_width" in the horizontal direction to "Film_height" in the vertical direction of the area on the film corresponding to the rectangular area cut out from the squeezed image to obtain an edge-cropped image is 4:3, the following equation is given.

Film_e_width=4/3×Film_height

Therefore, the number of pixels "Video_e_width_pixel" in the horizontal direction and the number of pixels "Video_e_height_pixel" in the vertical direction of the rectangular area cut out from the squeezed image to obtain an edge-cropped image (referred to as "cut-out area", hereinafter) can be obtained by the following equations.

Video_e_width_pixel
=Film_e_width/(Film_width/Video_width_pixel)
=4×Film_height×Video_width_pixel/(3×Film_width)
Video_e_height_pixel
=Video_height_pixel While center point of the cut-out area as seen on the film is at a distance of Xe [mm] from the film center in the horizontal direction, the center point of the cut-out area as seen on the squeezed image is at a distance of (Xe×Video_width_pixel/Film_width) pixels from the center of the squeezed image. Accordingly, if Xe_pixel=Xe×Video_width_pixel/Film_width, and if the center of the squeezed image is the origin (0, 0), the coordinates of the center of the cut-out area are expressed as (Xe_pixel, 0).

The coordinate converter 2 calculates the cut-out area center (Xe_pixel, 0), the length Video_e_width_pixel of the horizontal sides of the cut-out area and the length Video_e_height of the vertical sides of the cut-out area from the cutting-out position information provided under the supervision of the maker, thereby obtaining squeezed image cutting-out position information.

The multiplexer 3 is arranged to multiplex, for example, as an MPEG pan-scan vector, the squeezed image cutting-out position information calculated by the coordinate converter 2 with the encoded data.

That is, in the MPEG 2 Video Syntax, squeezed image cutting-out information can be given as a pan-scan vector, thereby enabling pan-scan in accordance with the squeezed image cutting-out information. Pan-scan can be achieved by providing suitable parameters in a sequence header, a sequence display extension and a picture display extension.

The following are definitions of a sequence header, a sequence display extension and a picture display extension in the MPEG 2 Video Syntax.

```
Sequence header
sequence_header() {
    sequence_header_code                    32      bslbf
    horizontal_size value                   12      uimsbf
    vertical_size value                     12      uimsbf
    aspect_ratio_information                4       uimsbf
    frame_rate_code                         4       uimsbf
    bit_rate_value                          18      uimsbf
    marker_bit                              1       bslbf
    vbv_buffer_size_value                   10      uimsbf
    constrained_parameters_flag             1       bslbf
    load_inter_quantiser_matrix             1       uimsbf
    if(load_inter_quantiser_matrix)
        intra_quantiser matrix[64]          8*64    uimsbf
    load_no_intra_quantiser_matrix          1       uimsbf
    if(load_no_intra_quantiser_matrix)
        no_intra_quantiser matrix[64]       8*64    uimsbf
    next_start_code()
}
Sequence display extension
sequence display_extension() {
    extension_start_code_identifier         4       uimsbf
    video_format                            3       uimsbf
    color_description                       1       uimsbf
    if(color_description) {
        color_primaries                     8       uimsbf
        transfer_characteristics            8       uimsbf
        matrix_coefficients                 8       uimsbf
    }
    display_horizontal_size                 14      uimsbf
    marker_bit                              1       bslbf
    display_vertical_size                   14      uimsbf
    next_start_code()
}
Picture display extension
picture_display_extension() {
    extension_start_code_identifier         4       uimsbf
    for(i=0;<number_of_frame_center_offset;i++) {
        frame_center_horizontal_offset      16      simsbf
        marker_bit                          1       bslbf
        frame_center_vertical_offset        16      simsbf
        marker_bit                          1       bslbf
    }
    next_start_code()
}
```

Figure 6:
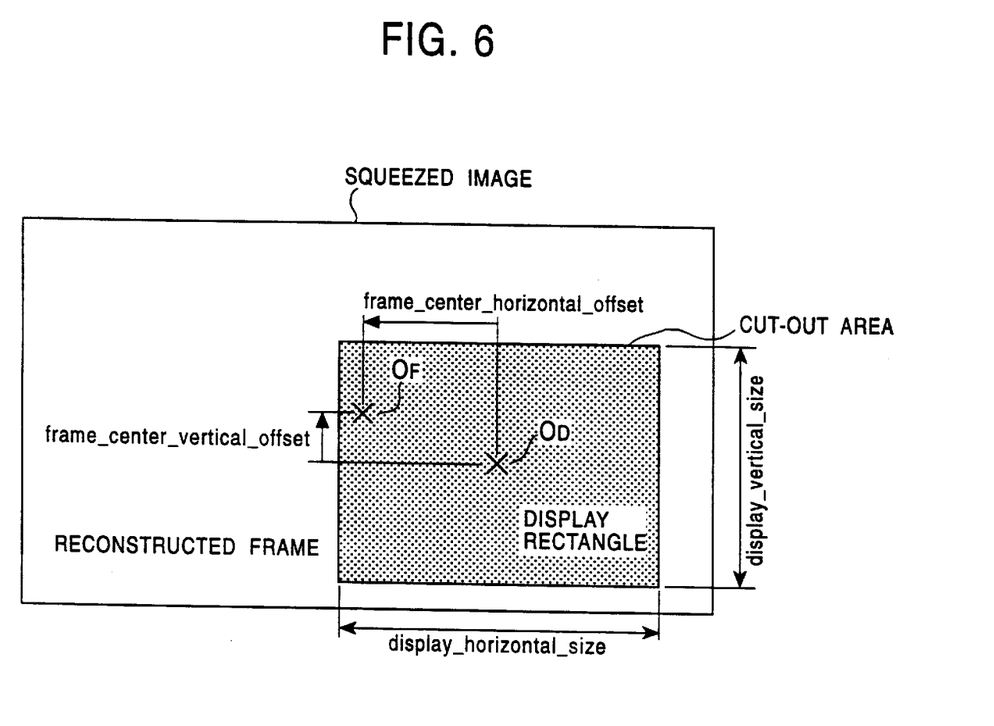
FIG. 6 is a diagram for explaining parameters set in a pan-scan vector.

The pan-scan vector is expressed with parameters shown in FIG. 6. That is, the parameter "frame_center_horizontal_offset" or "frame_center_vertical_offset" defined in the picture display extension represents the distance of the cut-out area center $O_D$ from the squeezed image center $O_S$ in the horizontal or vertical direction. The parameter "display_horizontal_size" or "display_vertical_size" defined in the sequence display extension represents the length (the number of pixels) of the cut-out area in the horizontal or vertical direction.

Figure 5A:
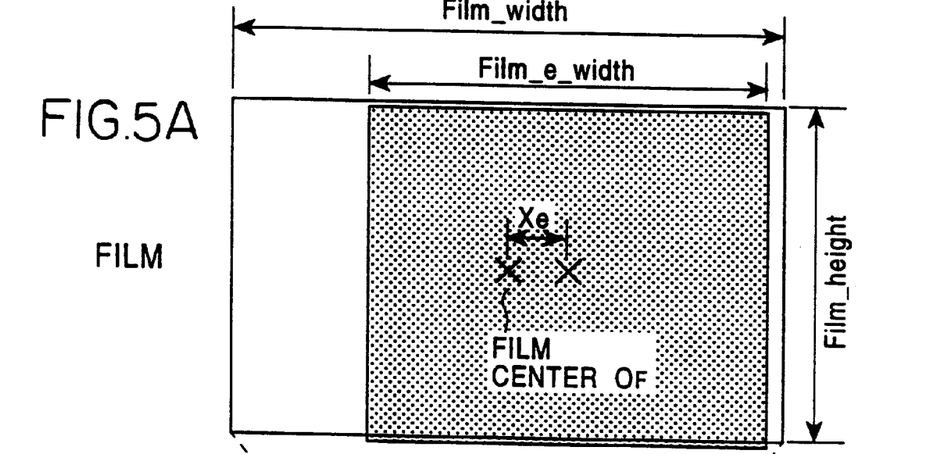
FIG. 5 is another diagram for explaining processing in the coordinate converter 2 shown in FIG. 2.
Figure 5B:
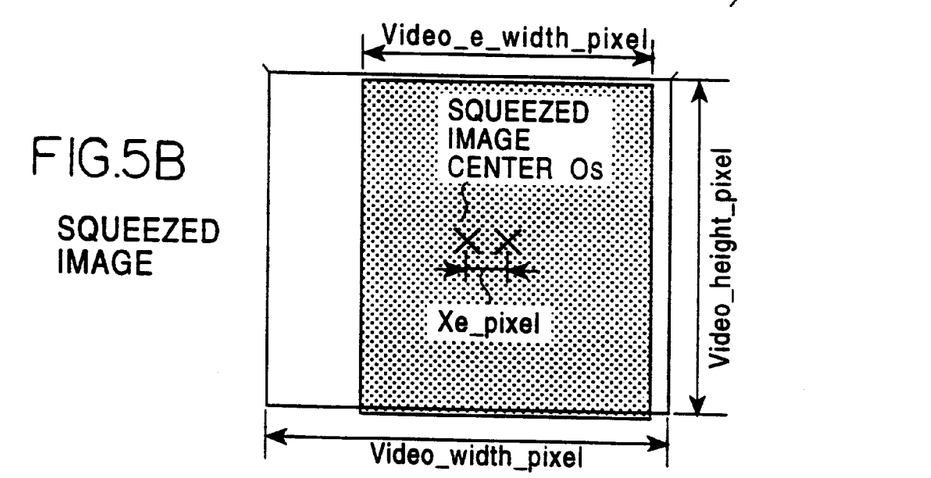

Accordingly, with respect to the case shown in FIG. 5, in the multiplexer 3, Xe_pixel and 0 which are the x-component (horizontal component) and the y-component (vertical component) of the center of the cut-out area are set as "frame_center_horizontal_offset" and "frame_center_vertical_offset", respectively, in the picture display extension. Also, "Video_e_width_pixel" and "Video_height_pixel" which represent the number of pixels in the horizontal and vertical directions of the cut-out area are set as "display_horizontal_size" and "display_vertical_size", respectively, in the sequence display extension.

Also in the multiplexer 3, other parameters are set in the pan-scan vector. For example, the number of pixels "Video_width_pixel" in the horizontal direction and the number of pixels "Video_height_pixel" in the vertical direction of the squeezed image are set as "horizontal_size_value" and "vertical_size_value" in the sequence header, respectively, and the aspect ratio in the case of display of the squeezed image in the original state (16:9 in this embodiment) is set as "aspect_ratio_information" in the sequence header.

Figure 7:
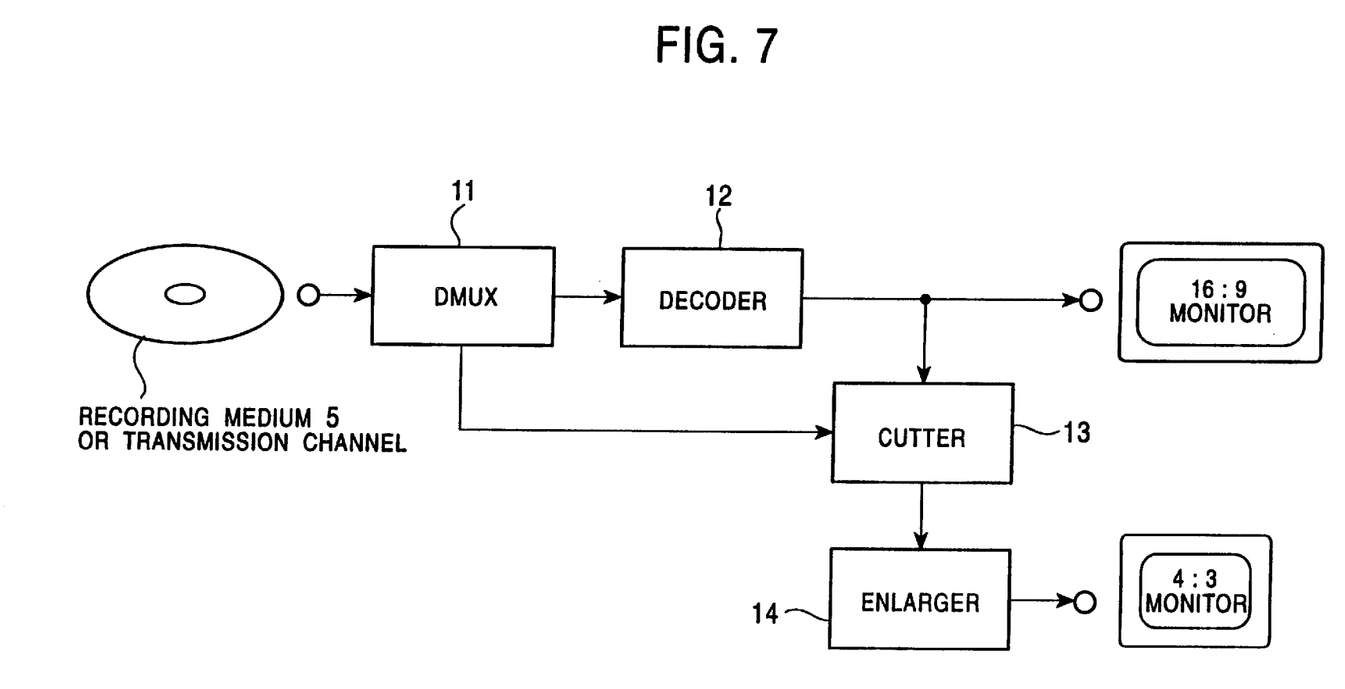
FIG. 7 is a block diagram showing the configuration of an embodiment of an image decoding apparatus to which the present invention is applied.

FIG. 7 shows the configuration of an embodiment of an image decoding apparatus to which the present invention is applied. Multiplex data obtained by the image encoding apparatus shown in FIG. 2 is supplied to demultiplexer 11 (separation means) 11. The demultiplexer 11 is arranged to separate the multiplex data into encoded data and squeezed image cutting-out position information, to supply the encoded data to a decoder 12 and to supply the squeezed image cutting-out position information to a cutter 13.

The decoder (decoding means) 12 is arranged to decode encoded data from the demultiplexer 11 into a sequence of 4:3 squeezed images in an MPEG decoding manner, for example. The cutter (cutting-out means) 13 is arranged to cut out the cut-out area of each of the sequence of squeezed images decoded by the decoder 12 in accordance with the cutting-out position information supplied from the demultiplexer 11, and to supply the cut-out area to an enlarger 14. The enlarger (up-sampling means) 14 is arranged to up-sample the cut-out area from the cutter 13 in the horizontal direction to form a 4:3 edge-cropped image.

In the image decoding apparatus thus arranged, multiplex data transmitted from the image coding apparatus shown in FIG. 2 via a transmission channel is received or multiplex data recorded on recording medium 5 is reproduced, and the received or reproduced multiplex data is supplied to the demultiplexer 11. In the demultiplexer 11, the multiplex data is separated into encoded data and squeezed image cutting-out position information. The encoded data and the squeezed image cutting-out position information are supplied to the decoder 12 and the cutter 13, respectively.

In the decoder 12, the encoded data from the demultiplexer 11 is MPEG-decoded into a sequence of 4:3 squeezed images. If a monitor on which the decoded images are displayed is a 16:9 monitor, the 4:3 squeezed images obtained by the decoder 12 are supplied to and displayed on the 16:9 monitor. In this case, the squeezed images are displayed in the original state, that is, the images elongated in the vertical direction are displayed by being extended in the horizontal direction, as described above.

On the other hand, in the case where the decoded images are displayed on a 4:3 monitor, the cutter 13 cuts out the cut-out area in accordance with the squeezed image cutting-out position information from the demultiplexer 11 from each of the squeezed images decoded by the decoder 12, and supplies the cut-out area to the enlarger 14. The enlarger 14 forms a sequence of 4:3 edge-cropped images by up-sampling the cut-out areas from the cutter 13, and supplies the image to the 4:3 monitor. Consequently, the edge-cropped images with director's approval are displayed on the 4:3 monitor.

The image decoding apparatus may select the squeezed image output or edge-cropped image output in such a manner that it automatically recognizes the aspect ratio of the monitors or it is provided with a switch for selecting one of the two outputs.

As described above, images are multiplexed with cutting-out position information provided under the supervision of the maker of the images, thereby avoiding a copyright problem.

The embodiments of the present invention have been described with respect to the system using aspect ratios of 16:9 and 4:3. However, the present invention can also be applied to systems using other aspect ratios.

Also, the embodiments of the present invention have been described with respect to cutting out a portion of each of squeezed images. However, the present invention can also be applied to the process of cutting out a portion of images not squeezed. If only cutting-out from ordinary images (not elongated in each of the vertical and horizontal directions) is performed, it is not necessary to provide the coordinate converter 2.

In the above-described embodiments of the present invention, images on a film are converted in a telecine manner. However, the present invention is also applicable even in the case where a director's approval is necessary for cutting out a portion of images other than telecine-converted images.

In the above-described embodiments, images are encoded and decoded by an MPEG encoding and decoding method. However, the encoding and decoding method according to the present invention is not limited to such a method, and it is not always necessary to encode images.

In the above-described image coding apparatus and method, encoded data of an image and cutting-out position information on positions at which a portion of the image is cut out under the supervision of a maker who made the image are multiplexed together, thereby enabling cutting-out from the image with an approval of the maker.

In the above-described image decoding apparatus and method, encoded data obtained by encoding an image and cutting-out position information on positions at which a portion of the image is cut out under the supervision of a maker who made the image are separated from transmitted data. The encoded data is decoded into the image, and a portion of the decoded image is cut out in accordance with the cutting-out position information. Thus, the image can be displayed with an approval of the maker of the image.

In the above-described image transmission method, an image and cutting-out position information on positions at which a portion of the image is cut out under the supervision of a maker who made the image are multiplexed and transmitted, thereby enabling cutting-out from the image with an approval of the maker.

On the above-described recording medium, an image is recorded together with cutting-out position information on positions at which a portion of the image is cut out under the supervision of a maker who made the image, thereby enabling cutting-out from the image with an approval of the maker.

What is claimed is:

1. A method of encoding a squeezed image obtained by squeezing an image on a film, said method comprising the steps of:

encoding the squeezed image;

generating cutting-out position information representing positions at which a portion of the image on the film is cut out under supervision of an operator who made the image on the film;

converting the cutting-out position information with respect to the image on the film into cutting-out position information with respect to the squeezed image; and multiplexing the encoded squeezed image and the cutting-out position information with respect to the squeezed image.

2. An image decoding apparatus comprising:

separation means for separating, from transmitted data, encoded data obtained by encoding a squeezed image generated by squeezing a non-squeezed image on a film and squeezed image cutting-out position information indicative of positions at which a portion of the squeezed image is cut out under the supervision of a maker who made the image, said squeezed image cutting-out position information being generated through conversion of non-squeezed image cutting-out position information indicative of positions at which a portion of the non-squeezed image is cut out under the supervision of a maker who made the image;

decoding means for decoding the encoded data into the squeezed image; and cutting-out means for cutting out, in accordance with the squeezed image cutting-out position information, a portion of the squeezed image decoded by said decoding means.

3. An apparatus according to claim 2, wherein said image is a squeezed image obtained by squeezing an image on a film, said apparatus further comprising up-sampling means for up-sampling the portion of the image cut out by said cutting-out means.

4. An apparatus according to claim 2, wherein the encoded data is obtained by encoding the image in a Moving Picture Experts Group (MPEG) coding manner, and the cutting-out position information is multiplexed as an MPEG pan-scan vector with the encoded data.

5. An image decoding method comprising the steps of:

separating, from transmitted data, encoded data obtained by encoding a squeezed image generated by squeezing a non-squeezed image on a film and squeezed image cutting-out position information indicative of positions at which a portion of the squeezed image is cut out under the supervision of a maker who made the image, said squeezed image cutting-out position information being generated through conversion of non-squeezed image cutting-out position information indicative of positions at which a portion of the non-squeezed image is cut out under the supervision of a maker who made the image;

decoding the encoded data into the squeezed image; and cutting out, in accordance with the squeezed image cutting-out position information, a portion of the squeezed image obtained by decoding in said decoding step.

6. A method of transmitting a squeezed image, comprising the steps of:

forming multiplex data by: encoding the squeezed image; generating cutting-out position information representing positions at which a portion of the image on the film is cut out under supervision of an operator who made the image on the film; converting the cutting-out position information with respect to the image on the film into cutting-out position information with respect to the squeezed image; and multiplexing the encoded squeezed image and the cutting-out position information with respect to the squeezed image; and transmitting the multiplex data.

7. A recording medium on which a squeezed image generated by squeezing a non-squeezed image on a film is recorded together with cutting-out position information representing positions at which a portion of the squeezed image on the film is cut out, said squeezed image cutting-out position information being generated through conversion of non-squeezed image cutting-out position information indicative of positions at which a portion of the non-squeezed image is cut out under the supervision of a maker who made the image.

8. An image coding apparatus which encodes a squeezed image obtained by squeezing an image on a film, said apparatus comprising:

encoding means for encoding the squeezed image;

means for generating cutting-out position information representing positions at which a portion of the image on the film is cut out under supervision of an operator who made the image on the film;

conversion means for converting the cutting-out position information with respect to the image on the film into cutting-out position information with respect to the squeezed image; and multiplexing means for multiplexing an output from the encoding means with the cutting-out position information with respect to the squeezed image.

9. An apparatus according to claim 8, wherein said encoding means encodes the image in a Moving Picture Experts Group (MPEG) coding manner, and said multiplexing means multiplexes the cutting-out position information as an MPEG pan-scan vector.

* * * * *